(12) United States Patent
Franke

(10) Patent No.: US 9,469,569 B2
(45) Date of Patent: Oct. 18, 2016

(54) CORROSION PROTECTED FIBRE-REINFORCED CEMENT COMPOSITION FOR USE IN COLD TEMPERATURE CONDITIONS

(71) Applicant: YARA INTERNATIONAL ASA, Oslo (NO)

(72) Inventor: Wolfram Franke, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 15/030,131

(22) PCT Filed: Oct. 21, 2014

(86) PCT No.: PCT/EP2014/072544
§ 371 (c)(1),
(2) Date: Apr. 18, 2016

(87) PCT Pub. No.: WO2015/059139
PCT Pub. Date: Apr. 30, 2015

(65) Prior Publication Data
US 2016/0264467 A1    Sep. 15, 2016

(30) Foreign Application Priority Data
Oct. 21, 2013    (NO) .................................... 20131392

(51) Int. Cl.
| C04B 28/02 | (2006.01) |
| C04B 24/20 | (2006.01) |
| C04B 14/48 | (2006.01) |
| C04B 40/00 | (2006.01) |
| C04B 111/76 | (2006.01) |

(52) U.S. Cl.
CPC ............ C04B 28/021 (2013.01); C04B 14/48 (2013.01); C04B 24/20 (2013.01); C04B 40/0075 (2013.01); C04B 2111/766 (2013.01)

(58) Field of Classification Search
CPC ..... C04B 14/00; C04B 14/48; C04B 22/085; C04B 24/00; C04B 24/20; C04B 28/021; C04B 40/0039; C04B 40/0075; C04B 2111/766

See application file for complete search history.

(56) References Cited

U.S. PATENT DOCUMENTS

| 4,277,357 | A | * | 7/1981 | Boardman | ............. | C09K 5/063 |
| | | | | | | 126/400 |
| 7,125,441 | B1 | * | 10/2006 | Furman | ................... | C04B 28/02 |
| | | | | | | 106/14.13 |
| 8,366,825 | B2 | * | 2/2013 | Sabio | ..................... | C04B 28/04 |
| | | | | | | 106/724 |
| 8,653,186 | B2 | * | 2/2014 | Nicoleau | ................. | C04B 28/02 |
| | | | | | | 106/600 |
| 9,045,377 | B2 | * | 6/2015 | Nicoleau | ............. | C04B 40/0039 |
| 9,376,342 | B2 | * | 6/2016 | Franke | ................. | C04B 22/085 |
| 2004/0149174 | A1 | | 8/2004 | Farrington et al. |
| 2004/0244655 | A1 | * | 12/2004 | Buerge | ................. | C04B 24/122 |
| | | | | | | 106/823 |
| 2009/0050023 | A1 | * | 2/2009 | Buerge | ................. | C04B 24/122 |
| | | | | | | 106/706 |
| 2011/0203486 | A1 | | 8/2011 | Nicoleau et al. |

FOREIGN PATENT DOCUMENTS

GB    2195328 A    4/1988

OTHER PUBLICATIONS

PCT International Search Report and Written Opinion dated Feb. 20, 2015 for PCT International Patent Application No. PCT/EP2014/072544, 10 pages.
Written Opinion dated Oct. 1, 2015 for PCT International Patent Application No. PCT/EP2014/072544, 5 pages.
Justnes H, entitled "Calcium Nitrate as a Multifunctional Concrete Admixture," SINTEF Technology and Society, Concrete, Jan. 31, 2006, 8 pages.
PCT Notification of Transmittal of the International Preliminary Report on Patentability dated Feb. 3, 2016 in connection with PCT International Patent Application No. PCT/EP2014/072544, 14 pages.

* cited by examiner

*Primary Examiner* — Anthony J Green
(74) *Attorney, Agent, or Firm* — Amster, Rothstein & Ebenstein LLP

(57) ABSTRACT

The present invention relates to an admixture for a cementitious composition, the cementitious composition comprising said admixture and a method for casting a durable cementitious solid, in particular a concrete, in cold weather conditions, such as in winter time or in cold geographical areas, more in particular for casting part of the cement tube in bore hole drilling in cold weather conditions.

18 Claims, 2 Drawing Sheets

CORROSION PROTECTED FIBRE-REINFORCED CEMENT COMPOSITION FOR USE IN COLD TEMPERATURE CONDITIONS

CROSS-REFERENCE TO RELATED APPLICATIONS

This application is a U.S. national stage entry under 35 U.S.C. §371 of PCT International Patent Application No. PCT/EP2014/072544, filed Oct. 21, 2014, which claims priority to Norwegian Patent Application No. 20131392, filed Oct. 21, 2013, the contents of which are incorporated herein by reference in their entirety.

FIELD OF THE INVENTION

The present invention relates to an admixture for a cementitious composition, the cementitious composition comprising said admixture and a method for casting a durable cementitious solid, in particular a concrete, in cold weather conditions, such as in winter time or in cold geographical areas, more in particular for casting part of the cement tube in bore hole drilling in cold weather conditions. The admixture comprises at least metallic fibres, two different nitrate salts and a super-plasticizer.

BACKGROUND OF THE INVENTION

Concrete is a composite construction material composed primarily of aggregate, cement, and water. There are many formulations, which provide varied properties. The aggregate is generally coarse gravel or crushed rocks such as limestone, or granite, along with a fine aggregate such as sand. The cement, commonly Portland cement, and other cementitious materials such as fly ash and slag cement, serve as a binder for the aggregate. Various chemical admixtures are also added to achieve varied properties. For example, to reinforce a concrete, fibres can be added, such as metal fibres, polymer fibres, organic fibres, asbestos fibres and the like. Water is mixed with the dry concrete mixture, which enables it to be shaped (typically poured or casted) and then solidified and hardened (cured, set) into rock-hard strength concrete through a chemical process called hydration. The water reacts with the cement, which bonds the other components together, finally creating a robust stone-like material. Concrete can be damaged by many processes, such as the freezing of water trapped in the concrete pores.

Concrete is widely used for making architectural structures, foundations, brick/block walls, pavements, bridges/overpasses, motorways/roads, runways, parking structures, dams, pools/reservoirs, pipes, footings for gates, fences and poles and even boats.

One particular application of concrete is its use for casting the cement tube in bore hole drilling. The cement tube is used to withstand the pressure from outside the bore hole, which can be the hydrostatic outside pressure from the water the surrounding earth/soil. Under ordinary conditions, the outside pressure contracts the tube. As hydrated cement is a material, optimized to withstand pressure, the outside pressure does not damage the cement tube. Ordinary loads from inside the tube are usually not larger than the external forces, hence under standard conditions cracking is not a risk. However, under non-standard conditions, like a blow-out, the cement tube is strongly pressurized from the inside, and hence, a tension stress is exerted on the cement tube. This may lead to brittle cracking, and hence to an unwanted and potentially hazardous emission of gas, oil and bore hole liquids. Due to geometry of the cement tube, a reinforcement with reinforcement steel bars or meshed grids that can prevent such cracking is not possible.

Fibre reinforcement has become popular for concrete construction for conventional use during the last decade. Metallic, glass and polymer fibres are used to replace the steel bar or grid reinforcements. Such fibres provide tensional strength, and by distributing the load, the necessary cracks are minimized. Thus, a fibre-reinforced structure is more elastic and in addition does not limit the choice of geometry.

After drilling, the oil/gas production tube or water/steam injection tube are inserted. To increase the weight and by that, increase the counter pressure towards the oil/gas well, a completion fluid is filled into the hole. Most of the cross section is covered with the completion fluid. The completion fluids used usually contain chlorides. Usually, stainless steel tubes are used for the gas/oil or water/steam hose.

In cold areas, the surface buildings and the top of the cement tube are exposed to low temperatures and frost during construction and operation. Due to shale gas exploitation, this situation is becoming more actual than ever, as a number of potential shale resources are located in cold areas in Russia and Canada.

Casting and curing concrete in cold weather, in particular at or below a—sustained—freezing temperature is challenging. The most common problem is that concrete freezes and/or goes through freeze/thaw cycles before acquiring adequate strength during curing.

Within the context of this application, "cold weather" is defined when the following conditions exist for at least three consecutive days:
 the average daily temperature falls below 4° C., and
 the air temperature does not rise above 10° C. for more than half a day in any 24-hour period.

At said cold weather conditions, water starts to freeze in capillaries of concrete at −2° C., it expands up to 9% of its volume when it freezes causing cracks in the concrete matrix, and up to 50% of compressive strength reduction may occur if concrete freezes before reaching at least a compressive strength of 500 psi.

Casting concrete in cold weather follows the recommendations by ACI (American Concrete Institute) Guideline 306R-88. Insulation of the cast concrete, the use of setting accelerators (SA) and of water-reducing agents, also known as superplasticizer (SP), are described as measures to ensure a proper curing of the concrete.

A widely known approach is to add sodium nitrate to the concrete at dosages of up to 5 weight % relative to the concrete composition, comprising at least aggregate, cement, and water. This approach usually delivers quick-setting cement. U.S. Pat. No. 5,296,028 (Charles J. Korhonen et al., 1994) discloses an antifreeze composition consisting of sodium nitrate and sodium sulphate at a ratio of 3:1, wherein the antifreeze composition is present in the concrete at a dosage of 2 weight % to 8 weight %, relative to the weight of the concrete composition. However, the high alkali addition due to sodium increases the risk of alkali-aggregate-reactions (AAR) and in addition, sodium nitrate is known to significantly reduce compressive strength. Hence, this kind of concrete has a reduced durability, especially when it comes to freeze/thaw-resistance.

Some commercially available products combine several components in one admixture, such as a superplasticizer (SP) and a setting accelerator (SA). Water reduction using a superplasticizer (SP) is a common technique to reduce free water and increase salinity of the pore fluids (which also reduces the freezing point of water). For instance, U.S. Pat. No. 5,176,753 (John W. Brook, 1993) or the equivalent patent GB 2,195,328 (Sandoz, John W. Brook, 1993) describes the combined use of (1) a mineral freezing point depressant, for example calcium nitrate, (2) a superplasticizer, for example the sodium salt of naphthalene sulphonate-formaldehyde resin, (3) an inorganic set accelerator, for example sodium thiocyanate, and (4) an organic set accelerator, for example tetra (N-methylol) glycoluril.

In order to obtain a very quick setting of the concrete, the prior art literature indicates that trivalent ions like aluminium ($Al^{3+}$) or iron ($Fe^{3+}$) might be beneficial. This is documented especially for shotcrete (concrete conveyed through a hose and pneumatically projected at high velocity onto a surface, as a construction technique). U.S. Pat. No. 4,444,593 discloses ferric nitrate blends for rapid setting. WO97/36839 (Tjugum, 1997) discloses aluminium-based salts, in particular aluminium nitrate. Shotcrete is not linked to cold weather concreting, as the concrete is, for example, applied in tunnels where no cold weather conditions prevail, in particular no temperatures below the freezing point of water.

Harald Justnes in Concrete, Volume 44, Number 1, February 2010 *"Calcium nitrate as a multi-functional concrete admixture"*, discloses the use of calcium nitrate as a set accelerator when used with a plasticiser counteracting the retardation by the plasticiser while maintaining rheology, as long-term strength enhancer, in anti-freeze admixtures or winter concreting admixtures, and as a corrosion inhibitor for the protection of embedded steel.

Standards are available describing how to cast concrete that needs to have increased freeze-thaw-resistance, for instance by adding an air-entraining-admixture (AEA).

However, there is still a need for an admixture that ensures a quick and sufficient hydration of a metallic fibre-reinforced cementitious composition and that improves the long term behaviour, mechanical strength and the resistance to corrosion and erosion of the cementitious solid comprising said admixture. In particular, such admixture can be used for casting the cement tube in drilling operations in cold weather conditions, in particular until the depth where the temperature reduces the metal tension.

BACKGROUND PRIOR ART

EP 1 284 248 (Schlumberger, 2003) discloses a cement slurry comprising lightweight particles and at least one alkali-resistant non-metallic fibre (glass fibres or polymer fibres), present in an amount of less than 2 weight %, and having a length of less than 6 cm and an aspect ratio of greater than 10. The patent document does not disclose the use in cold weather conditions.

U.S. Pat. No. 7,267,173 B2 (Schlumberger, 2007) discloses the use of metallic fibres, in particular FIBRAFLEX particles, which are marketed as corrosion resistant in salt (chlorides and sulphates) and acid environments, in a cement slurry comprising a first fibrous component made of metallic fibres and a second fibrous component made of glass, carbon or polymeric fibres. The patent document does not disclose the use in cold weather conditions.

EP 1 769 132 (Halliburton, 2011) discloses the use of non-amorphous metallic fibres in a method of cementing in a subterranean formation wherein the fibres have a certain mean aspect ratio. To reduce the corrosion resistance, the fibres are coated with a surfactant. The patent document does not disclose the use in cold weather conditions.

In our co-pending and unpublished application, we have claimed and described an admixture for a cementitious composition comprising calcium nitrate, aluminium nitrate, and a superplasticizer (SP), a cementitious solid made thereof, and a method for casting a cementitious composition that ensures a quick and sufficient hydration and improves long term behaviour, mechanical strength and resistance to corrosion and erosion of the cementitious solid.

DETAILED DESCRIPTION OF THE INVENTION

It is the primary goal of the present invention to provide an admixture for a cementitious composition, reinforced at least with metallic fibres, the reinforced cementitious composition comprising said admixture, the reinforced cementitious solid comprising the admixture, or comprising the individual components of the admixture, and a method for casting a reinforced cementitious composition that ensures a quick and sufficient hydration, improves long term behaviour, and provides a reinforced cementitious composition that can be cast in cold weather conditions.

This goal is met by the admixture for a metal-fibre reinforced cementitious composition of the present invention according to claim 1, comprising a) metallic fibres, b) calcium nitrate, c) aluminium nitrate, d) a superplasticizer (SP), and e) optionally, an air entraining agent (AEA).

Obviously, and known to the skilled person, the amounts of components a), b), c), d) and e) are within the normal working range of additive amounts, further specified below.

Surprisingly, the inventors have found that the admixture according to the invention solves two problems: it provides for a quick and sufficient hydration of a cementitious composition when cast, and it provides anti-corrosion properties to the metallic fibres, such that any metallic fibre can be used, and the type of metallic fibre is not limited to coated metallic fibres or stainless-steel metallic fibres, thus reducing the cost of for example, casting the cement tube in drilling operations.

Within the scope of this application, a cementitious composition should be interpreted as comprising any one of a mortar composition, a concrete composition, and a cement paste composition, which has not been casted, cured, hydrated, set and/or hardened. A mortar composition comprises at least a fine aggregate, such as sand, cement and optionally water. A cement paste composition comprises at least cement and optionally water. A cementitious composition not containing water in such amounts that the setting is initiated is called a cementitious composition in the dry state. According to a preferred embodiment, a cementitious composition is produced by adding all ingredients together and thoroughly mixing said ingredients until a homogeneous composition is obtained.

Within the scope of this application, a cementitious solid should be interpreted as the casted, cured, hydrated, set and/or hardened cementitious composition, comprising anyone of a mortar, a concrete and a cement paste, and water. A cementitious solid is usually obtained by adding water to a cementitious composition, which initiates the curing process. According to a preferred embodiment, the cementitious solid is produced by adding water to the cementitious composition.

The admixture according to the invention focuses on the effective and synergetic combination of specific chemicals, in combination with the metallic fibres therein, to ensure sufficient hydration in order to support casting a metallic fibre-reinforced cementitious composition, in particular concrete in cold weather conditions with the benefit of increased durability. Especially heat development, sufficient hydration and prevention of freezing of water is focused. The admixture according to the invention comprising at least metallic fibres, two nitrate salts and a superplasticizer surprisingly proved to deliver satisfying results in a lab scale test. Furthermore, in order to increase durability, also an air entraining agent was used.

The first component in the admixture is metallic fibres. The term "fibre" used herein also includes ribbon or platelet structures that accomplish the same performance as normal fibre structures.

The term "fibre" used herein relates to high aspect ratio material in the range of 1.25 to 400, preferably from 15 to 200. The fibres have a mean length in the range of from 0.1 mm to 10 mm, and a mean diameter in the range of from 0.025 mm to 0.1 mm.

The metallic fibres can be any metal high aspect ratio material that comprises, mostly non-amorphous (e.g. crystalline), metallic fibres. In certain embodiments, the metallic fibres may be obtained by cold-drawing low-carbon steel wires (e.g. steel wool). Suitable metallic fibres include, but are not limited to, chopped steel fibres, stainless steel fibres, brass fibres, bronze fibres, nickel fibres, and titanium fibres. In certain embodiments of the present invention, the metallic fibres are low-carbon steel wool fibres.

Preferably, the fibres are not coated with a corrosion-inhibiting layer, such as the Fibraflex® fibres (Saint-Gobin Seva, France).

In one embodiment, the invention relates to a cementitious composition, wherein the metallic fibres are present at a concentration of 0.5 to 10 weight %, relative to the weight of the cement.

Due to the density of the fibres, certain types of fibres may exhibit a propensity to settle out of the cementitious composition of the present invention. Therefore, certain embodiments of the invention comprising such fibres may comprise a settling-prevention additive, such as a viscosifier, that may eliminate, or at least reduce, settling.

The second component in the admixture is calcium nitrate, used as a setting accelerator, strength enhancer and corrosion inhibitor. Calcium nitrate is an inorganic compound with the formula $Ca(NO_3)_2$. This colourless salt absorbs moisture from the air and is commonly found as a tetrahydrate. It is mainly used as a component in fertilizers. A variety of related salts are known including calcium ammonium nitrate decahydrate and calcium potassium nitrate decahydrate. Preferably, pure calcium nitrate is used. However, pure calcium nitrate is difficult to handle due to its hygroscopic properties. Different calcium nitrate salts are available from Yara International ASA (Oslo, Norway) under the brand names NitCal (a solid with a concentration of about 78 weight % of calcium nitrate), NitCal/K (a solid with a concentration of about 76 weight % of calcium nitrate) and NitCal Sol (an aqueous liquid with a concentration of 50 weight % calcium nitrate), all of them marketed as a chlorine-free multifunctional concrete admixture. It may be used as a dry material (granulated or prilled) or as a liquid (for example, as an aqueous liquid in a concentration of 50 weight % calcium nitrate). It may also be used (and it acts) as a corrosion inhibitor, since the nitrate ion leads to formation of iron hydroxide, whose protective layer reduces corrosion of the concrete reinforcement.

In one embodiment, the invention relates to a cementitious composition, wherein the calcium nitrate is present at a concentration of 2.5 to 3.5 weight %, relative to the weight of the cement.

The third component is aluminium nitrate, used as a fast-reacting and high heat developing setting accelerator. Initial heat "on site" is important to quickly obtain hydration reactions. Thus, initial heat needs to be generated quickly. It was shown that nitrates containing mono- and divalent anions like sodium or calcium perform slowly in cold environments. Experiments showed that trivalent ions, such as aluminium react far quicker. Aluminium nitrate is commonly used in shotcrete at non-freezing conditions. Additionally, aluminium nitrate delivers more nitrate per mol (87%) than calcium nitrate (74%), and therefore, the nitrate-based corrosion inhibiting effect is increased, as well as the salinity in pore liquid. Aluminium nitrate is a salt of aluminium and nitric acid, existing normally as a crystalline hydrate, most commonly as aluminium nitrate nonahydrate, $Al(NO_3)_3 \cdot 9H_2O$. It is, for example, available from Sigma-Aldrich as a solid with different purities.

In one embodiment, the invention relates to a cementitious composition, wherein the aluminium nitrate is present at a concentration of 0.5 to 1.0 weight %, relative to the weight of the cement.

As fourth component, a superplasticizer is used to reduce the water content, preferably down to a water/cement weight ratio (w/c) of 0.3, leading to an increase of the salinity in comparison with untreated cementitious composition. The use of superplasticizers has become quite a common practice. They are used as dispersants to avoid particle aggregation in applications where well-dispersed particle suspensions are required. Superplasticizers are linear polymers containing sulfonic acid groups attached to the polymer backbone at regular intervals. Most of the commercial formulations belong to one of four families: sulphonated melamine-formaldehyde condensates (SMF), sulphonated naphthalene-formaldehyde condensates (SNF), modified lignosulphonates (MLS), and polycarboxylate derivatives. In the present invention, any superplasticizer can be used, depending on the type of application. According to one embodiment, a modified lignosulphonate (MLS) is used.

In one embodiment, the invention relates to a cementitious composition, wherein the superplasticizer is present at a concentration of 0.25 to 0.5 weight %, relative to the weight of the cement.

Optionally, as fifth component, an air entraining agent (AEA) may be used to improve freeze-thaw resistance. Construction structures exposed to winter conditions like building are most likely exposed in the same manner during their life time. Usually, the resistance of hydrated concrete is increased by adding an AEA to provide pore volume for freezing water. Air entrainment is the intentional creation of tiny air bubbles in concrete. The bubbles are introduced into the concrete by the addition to the mix of an air entraining agent, which is a surfactant (surface-active substance). The air bubbles are created during mixing of the plastic (flowable, not hardened) concrete, and most of them survive to be part of the hardened concrete. The primary purpose of air entrainment is to increase the durability of the hardened concrete, especially in weather conditions subject to freeze-thaw; the secondary purpose is to increase workability of the concrete while in a plastic state. Calcium nitrate shows no significant effect on porosity, but increases strength. As a consequence calcium nitrate is able to counteract strength changes from the AEA without reducing porosity. In the present invention, any air entraining agent can be used, depending on the type of application. According to one embodiment, a modified lignosulphonate (MLS) is used.

Preferably, an air entraining agent (AEA) is used in the admixture according to the invention.

In one embodiment, the invention relates to a cementitious composition, wherein the air entraining agent is present at a concentration of 0 to 0.04 weight %, preferably 0.02 to 0.04 weight %, relative to the weight of the cement.

According to one embodiment of the invention, the SP and the AEA are the same compound, as some SP are also foaming and therefore are able to deliver the required porosity. According to one embodiment of the invention, the superplasticizer and the air entraining agent are the same compound which is present at a concentration of 0.25 to 0.54 weight %, relative to the weight of the cement.

The cementitious composition comprising the admixture according to the invention can be prepared by adding each component a), b), c), d) and e) separately to the cementitious composition, or can be prepared by adding the admixture as a read-to-use admixture comprising components a), b), c), d) and e) to the cementitious composition. In that case, a ready-to-use admixture may be prepared comprising
a) 9 to 75 weight %, relative to the total weight of the admixture, of metallic fibres,
b) 18 to 74 weight %, relative to the total weight of the admixture, of calcium nitrate,
c) 3 to 24 weight %, relative to the total weight of the admixture, of aluminium nitrate,
d) 1.6 to 12.5 weight %, relative to the total weight of the admixture, of a superplasticizer (SP), and
e) 0 to 1 weight %, relative to the total weight of the admixture, of an air entraining agent (AEA),
wherein the sum of components a), b), c), d) and e) adds up to 100 weight %, which is subsequently added in the appropriate amounts to the cementitious composition.

The main challenge in the present invention is the unused water within the cementitious composition. For pure hydration, a water to cement ratio of 0.26 to 0.29 is required. Standard cementitious compositions, in particular concrete, are produced with water to cement ratios of 0.45 to 0.55. As a consequence, in standard concrete, plenty of water is still available after hydration which can potentially freeze up and damage the concrete. The main issue to prevent freezing is therefore the reduction of water down to ratios of 0.35 or less, which can be achieved by a water reducer. As setting retardation is not acceptable, the water reducing agent should be a superplasticizer (SP). By reducing the amount of unused water, the resulting concentration of salts is high enough to produce a saline solution that does not freeze at temperatures down to −20° C. Synergetic effects of calcium nitrate and SP have been shown by Justnes in Concrete, Volume 44, Number 1, February 2010 "Calcium nitrate as a multi-functional concrete admixture" in terms of strength development for ambient temperatures of 5° C. However, this effect was related to the strength development and setting time, but the freezing behaviour was not investigated. Our experimental results show that calcium nitrate, aluminium nitrate, an SP and a low water to cement ratio provide a cementitious composition that does not freeze up in cold weather conditions as a temperature as low as −20° C. As opposed to standard cementitious solid samples, the cementitious solid samples according to the invention cool down without the temperature plateau, due to the avoidance of water freezing.

The admixture for a cementitious composition according to the invention can be provided a physical mixture containing the components according to the invention, or it may be provided as a kit of part. Furthermore, two or more components may be premixed and provided separately from the other components according to the invention. For example, the metallic fibres can be mixed with the concrete before the other components are added.

According to a preferred embodiment, the cementitious composition according to the invention comprises:
a) 0.5 to 10 weight %, relative to the weight of the cement, of metallic fibres,
b) 2.5 to 3.5 weight %, relative to the weight of the cement, of calcium nitrate,
c) 0.5 to 1.0 weight %, relative to the weight of the cement, of aluminium nitrate,
d) 0.25 to 0.5 weight %, relative to the weight of the cement, of a superplasticizer (SP), and
e) 0 to 0.04 weight %, preferably 0.02 to 0.04 weight %, relative to the weight of the cement, of an air entraining agent (AEA).

The admixture for a cementitious composition according to the invention has several synergetic effects. The casted cementitious composition according to the invention, in particular concrete, is not freezing on the first day, as the water content is low enough to provide a high salinity in the pore water, shows increased freeze-thaw resistance, shows increased reinforcement corrosion inhibition due to high nitrate dosage and have increased long term strength.

The benefits of the components are summarized in the following synergy matrix (Table 1).

TABLE 1

| Synergy matrix | | | | |
|---|---|---|---|---|
| | Metallic fibres | Calcium Nitrate | Aluminium Nitrate | Superplasticizer with air entraining effect |
| Setting acceleration | — | X (Calcium) | X (Aluminium) | — |
| Water reduction without retardation | — | X | — | X |
| Initial freezing prevention | — | X (setting) | X (temperature) | X (water reduction) |
| Freeze-thaw-resistance | — | X (strength) | | X (porosity increase) |
| Reinforcement corrosion inhibition | — | X (Nitrate) | X (Nitrate) | — |
| Concrete Reinforcement | X | — | — | — |

In another aspect, the invention relates to a cementitious solid obtained from hardening (curing) the cementitious composition according to the invention.

In another aspect, the invention relates to a cementitious solid obtained from hardening (curing) the cementitious composition according to the invention wherein the cementitious solid is selected from the group of a mortar, a cement paste and a concrete.

Furthermore, the invention relates to a method for casting a cementitious solid comprising the steps of:
I) preparing a cementitious composition comprising mixing water, cement, the concrete admixture according to the invention, and optionally an aggregate;
II) casting the cementitious composition into a form; and
III) having the cementitious composition hardened into a cementitious solid.

According to a preferred embodiment, the invention further relates to a method for casting a cementitious solid comprising the steps of:

I) preparing a first composition comprising mixing water, metallic fibres, calcium nitrate, a superplasticizer and, optionally, an air entraining agent;
II) preparing a second composition comprising cement, the first composition and optionally an aggregate;
III) preparing a third composition by mixing aluminium nitrate with the second composition, shortly before casting the concrete;
IV) casting the third composition into a form.
V) having the third composition hardened into a cementitious solid.

The advantage of the latter method is that the heat generated by the addition of aluminium nitrate to the second composition is only generated right before the casting of the cementitious composition when it is most needed.

The listing or discussion of an apparently prior-published document in this specification should not necessarily be taken as an acknowledgement that the document is part of the state of the art or is common general knowledge.

The invention is further elucidated by means of the following examples and the accompanying figures. The following non-limiting examples only serve to illustrate the invention and do not limit its scope in any way. In the examples and throughout this specification, all percentages, parts and ratios are by weight unless indicated otherwise. It will be appreciated that the various percentage amounts of the different components that are present in the products of the invention, including any optional components, will add up to 100%.

Experimental

COMPARATIVE EXAMPLE 1

Figure 1:
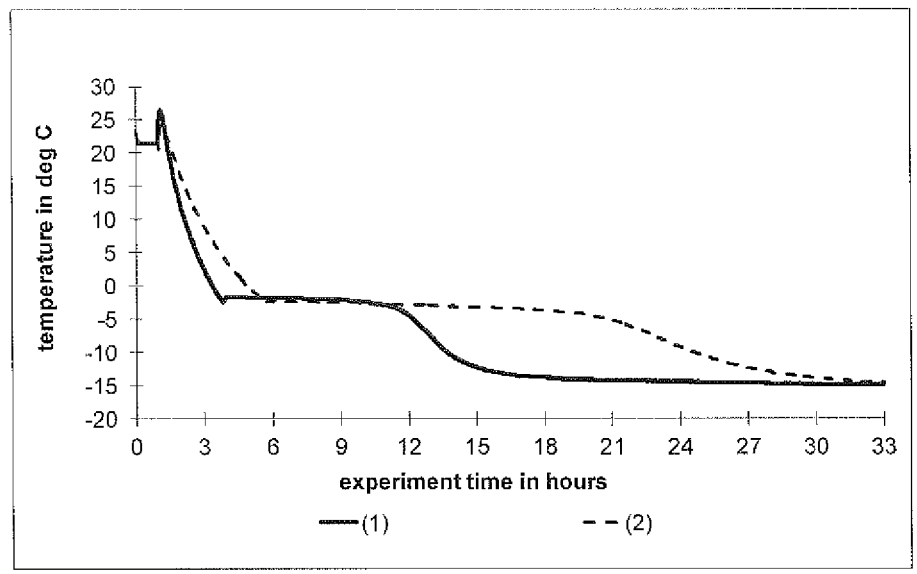
FIG. 1: Temperature profile versus time for two samples exposed to freezing conditions directly after preparation, one with insulation and one without insulation.

A cement paste (500 ml) was prepared from standard fly ash cement (CEM II/A 42.5 FA) with a w/c ratio=0.45 and cubic samples are cast. Sample (1) was exposed to freezing conditions directly after preparation. Sample (2) was placed in an insulation container (wall thickness 1 cm) before being exposed to freezing conditions. In FIG. 1 it can be seen that the insulation extends the time before freezing of the sample starts but only slightly in comparison with an unprotected sample. Due to a slower heat release, the crystallization of water takes longer, as shown by the temperature plateau. Hence, the main effect of an insulation is only effective in an early stage of the curing and especially in close surface layers, there is a certain risk for freezing and hence, destruction of the concrete.

COMPARATIVE EXAMPLE 2

Concrete has a heat transfer coefficient of about 2 W/m/K, which is lower than steel (about 50 W/m/k) and higher than porous mineral materials (about 0.2 W/m/K). As a consequence, temperature adjustments in a concrete element take time and depend on hydration temperature (heat source) as well as ambient temperature (heat sink) Especially in cold ambient conditions, there is a risk that the limitation in energy flow from core to surface can lead to freezing of the outer layers with destructive effects. In addition, reinforcement (most commonly iron bars) is placed mostly in the outer layers and therefore increases heat loss to the environment.

Figure 2:
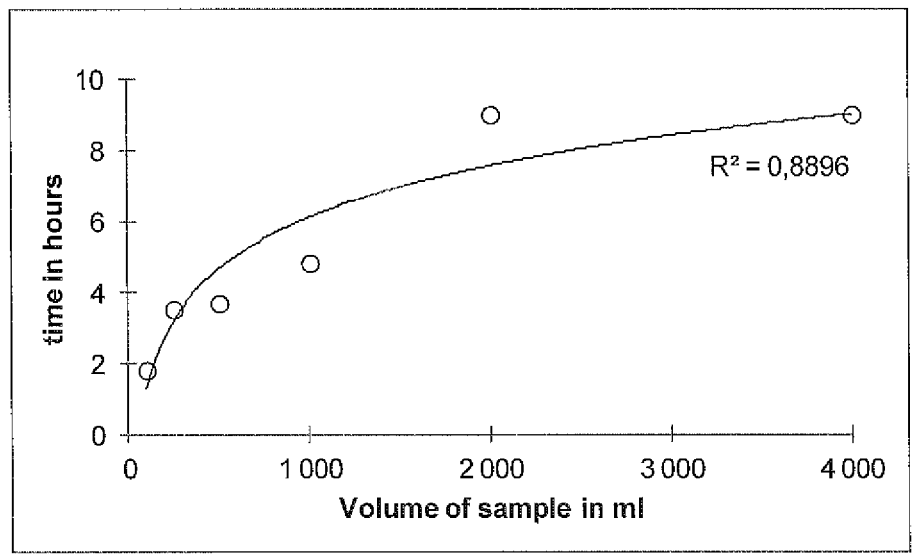
FIG. 2: Time-to-freeze curve for differently sized samples exposed to freezing conditions directly after preparation.

Cement paste samples of different volumes (4000, 2000, 1000, 500, 250, and 100 ml) were prepared from standard fly ash cement (CEM II/A 42.5 FA) with a w/c ratio=0.45 and cubic samples were cast. The temperature was measured in the core. Samples were cured at −15° C. directly after preparation. This experiment simulates different distances to the surface of a concrete structure. Temperature developments of the different samples are given in FIG. 2, which shows the time it takes for a core temperature to reach freezing temperature (0° C.) at ambient conditions, plotted versus size of the samples. The smaller samples freeze within a few hours, and samples of 2-liter cubes were hydrating for at least 8 hours. Hence, it can be derived that an unprotected surface layer will freeze quickly.

EXAMPLE 1

Four cement paste samples (500 ml) were prepared from standard fly ash cement (CEM II/A 42.5 FA) with a varying w/c ratio.

Sample (1) according to the prior art contains no additives (used as a reference) and has a w/c=0.45.

Sample (2) according to the prior art contains 4 weight % of added calcium nitrate (Nitcal from Yara International, Oslo, Norway) and has a w/c=0.45.

Sample (3) according to the invention contains 3 weight % of added calcium nitrate (Nitcal from Yara International, Oslo, Norway) and 1 weight % of aluminium nitrate and has a w/c=0.45.

Sample (4) according to the invention contains 3 weight % of added calcium nitrate (Nitcal from Yara International, Oslo, Norway), 1 weight % of aluminium nitrate, and 0.5 weight % of a modified lignosulphonate (Ultrazin from Borregaard Industries Ltd, Sarpsborg, Norway) as superplasticizer and has a w/c=0.30.

To these sample compositions metallic fibers are added for strengthening purposes. All weight % are given relative to the total amount cement.

Figure 3A:
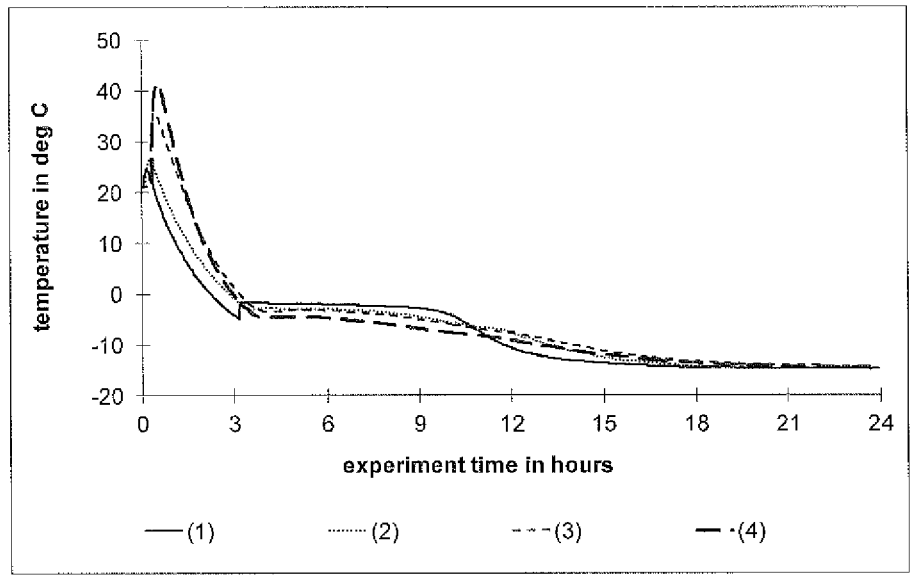
FIG. 3a: Temperature profile versus time for samples exposed to freezing conditions directly after preparation.
Figure 3B:
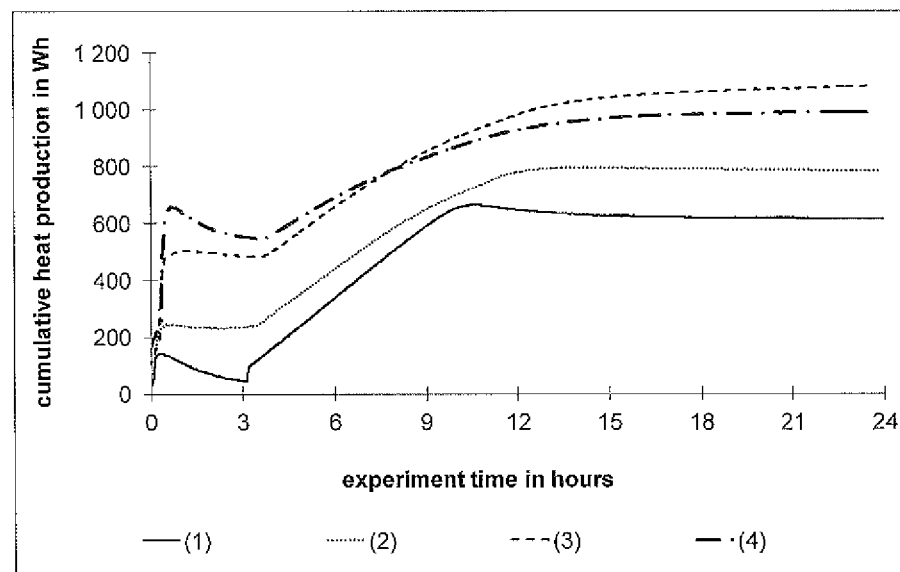
FIG. 3b: Cumulative heat production versus time for samples exposed to freezing conditions directly after preparation.

The addition of aluminium nitrate leads to an increased initial hydration heat, as is shown in FIG. 3a. The water reduction leads to an even lower tendency of freezing, and especially the heat production during the first 8 hours was highest (sample (3) and (4)). Additionally, FIG. 3b shows that the heat release and therefore hydration takes place during a period of 18 hours. However, most intense in all cases is the reactivity within the first 3 hours. In this period, the heat release in sample (4) was 5 to 8 times higher than in the reference sample (1).

The invention claimed is:
1. Admixture for a cementitious composition, comprising:
a) 9 to 75 weight %, relative to the total weight of the admixture, of metallic fibres,
b) 18 to 74 weight %, relative to the total weight of the admixture, of calcium nitrate,
c) 3 to 24 weight %, relative to the total weight of the admixture, of aluminium nitrate,
d) 1.6 to 12.5 weight %, relative to the total weight of the admixture, of a superplasticizer (SP), and e) 0 to 1 weight %, relative to the total weight of the admixture, of an air entraining agent (AEA), wherein the sum of components a), b), c), d) and e) adds up to 100 weight %.

2. Cementitious composition comprising:
i) cement,
ii) water,
iii) the admixture for a cementitious composition according to claim 1, and
iv) optionally an aggregate.

3. The cementitious composition according to claim 2, selected from the group consisting of a mortar composition, a cement paste composition, and a concrete composition.

4. The cementitious composition according to claim 2, wherein the water to cement weight ratio (w/c) is in the range of about 0.30 to 0.35.

5. The cementitious composition according to claim 2, wherein the metallic fibres are present at a concentration of 0.5 to 10 weight %, relative to the weight of the cement.

6. The cementitious composition according to claim 2, wherein the calcium nitrate is present at a concentration of 2.5 to 3.5 weight %, relative to the weight of the cement.

7. The cementitious composition according to claim 2, wherein the aluminium nitrate is present at a concentration of 0.5 to 1.0 weight %, relative to the weight of the cement.

8. The cementitious composition according to claim 2, wherein the superplasticizer is present at a concentration of 0.25 to 0.5 weight %, relative to the weight of the cement.

9. The cementitious composition according to claim 2, wherein the air entraining agent is present at a concentration of 0 to 0.04 weight % relative to the weight of the cement.

10. The cementitious composition according to claim 9, wherein the air entraining agent is present at a concentration of 0.02 to 0.04 weight % relative to the weight of the cement.

11. The cementitious composition according to claim 2, wherein the superplasticizer and the air entraining agent are the same compound which is present at a concentration of 0.25 to 0.54 weight %, relative to the weight of the cement.

12. The cementitious composition according to claim 2, comprising:
a) 0.5 to 10 weight %, relative to the weight of the cement, of metallic fibres,
b) 2.5 to 3.5 weight %, relative to the weight of the cement, of calcium nitrate,
c) 0.5 to 1.0 weight %, relative to the weight of the cement, of aluminium nitrate,
d) 0.25 to 0.5 weight %, relative to the weight of the cement, of a superplasticizer (SP), and
e) 0 to 0.04 weight % relative to the weight of the cement, of an air entraining agent (AEA).

13. The cementitious composition according to claim 12, comprising 0.02 to 0.04 weight % relative to the weight of the cement, of an air entraining agent (AEA).

14. Cementitious solid obtained from hardening the cementitious composition according to claim 2.

15. Cementitious solid according to claim 14, selected from the group consisting of a mortar, a cement paste and a concrete.

16. Method for casting a cementitious solid comprising the steps of:
I) preparing a cementitious composition comprising mixing water, cement, the concrete admixture according to claim 1, and optionally an aggregate;
II) casting the cementitious composition into a form; and
III) having the cementitious composition hardened into a cementitious solid.

17. The method of claim 16, wherein at least the casting step takes place in cold weather conditions.

18. The method of claim 16, wherein at least the casting step takes place at a temperature below 0° C.

* * * * *